United States Patent
Gracner et al.

(10) Patent No.: US 8,490,605 B2
(45) Date of Patent: Jul. 23, 2013

(54) ACTUATING DRIVE FOR BIDIRECTIONAL ACTUATOR

(75) Inventors: Reinhold Gracner, Griffen (AT); David Klemen, Völkermarkt (AT)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 563 days.

(21) Appl. No.: 12/743,067

(22) PCT Filed: Nov. 11, 2008

(86) PCT No.: PCT/EP2008/065288
§ 371 (c)(1),
(2), (4) Date: Sep. 10, 2010

(87) PCT Pub. No.: WO2009/062928
PCT Pub. Date: May 22, 2009

(65) Prior Publication Data
US 2010/0319663 A1    Dec. 23, 2010

(30) Foreign Application Priority Data
Nov. 16, 2007 (DE) .................. 10 2007 054 769

(51) Int. Cl.
*F02M 25/07*    (2006.01)
(52) U.S. Cl.
USPC ............ 123/568.11; 123/188.1; 251/129.11
(58) Field of Classification Search
USPC ............ 123/568.11, 568.23, 568.24, 188.1, 123/188.4, 188.16; 251/129.11, 129.12
See application file for complete search history.

(56) References Cited

U.S. PATENT DOCUMENTS

| | | | |
|---|---|---|---|
| 4,050,670 A | | 9/1977 | Borg et al. |
| 4,429,771 A | * | 2/1984 | Martin .................. 188/170 |
| 4,524,637 A | * | 6/1985 | Yoshizumi .................. 74/569 |
| 4,627,528 A | * | 12/1986 | Mikusch et al. ........... 198/621.1 |
| 4,690,119 A | | 9/1987 | Makino et al. |
| 4,920,782 A | * | 5/1990 | Hellwig .................. 72/451 |
| 6,102,016 A | | 8/2000 | Sitar et al. |
| 6,170,353 B1 | * | 1/2001 | Worner et al. ............ 74/473.21 |
| 6,216,677 B1 | | 4/2001 | McConnell et al. |
| 6,708,677 B2 | * | 3/2004 | Brosseau et al. ........ 123/568.18 |
| 6,886,546 B1 | * | 5/2005 | Bircann et al. .......... 123/568.23 |
| 7,775,197 B2 | * | 8/2010 | Hannewald et al. ..... 123/568.24 |
| 8,089,185 B2 | * | 1/2012 | Hatano et al. .................. 310/80 |

FOREIGN PATENT DOCUMENTS

| | | |
|---|---|---|
| DE | 198 54 614 A1 | 5/2000 |
| DE | 103 27 868 A1 | 1/2005 |

(Continued)

OTHER PUBLICATIONS

European Opposition for WO 2007/127962.

*Primary Examiner* — John Kwon
(74) *Attorney, Agent, or Firm* — Rader, Fishman & Grauer PLLC

(57) ABSTRACT

An actuating drive for a bi-directionally adjustable actuator for at least on of an exhaust gas recirculation device and an exhaust gas turbocharger. The actuating drive includes an electric motor; a toggle lever, which articulates with the actuator via a first toggle lever bearing; and a gear mechanism, connecting the electric motor with the toggle lever, wherein the gear mechanism includes a toothing element on an output side mounted in a pivot bearing, wherein the toggle lever is articulating mounted via a second toggle lever bearing, wherein in a starting state of the actuating drive is associated with a starting position of the actuator, and wherein an acute angle exists between a first straight line extending through the first toggle lever bearing and through the second toggle lever bearing, and a second straight line extending through the pivot bearing and through the second toggle lever bearing.

20 Claims, 4 Drawing Sheets

FOREIGN PATENT DOCUMENTS

| | | |
|---|---|---|
| DE | 10 2004 058 085 A1 | 7/2005 |
| DE | 10 2005 028 372 A1 | 12/2006 |
| EP | 1 028 249 A2 | 8/2000 |
| EP | 1 647 698 A2 | 4/2006 |
| WO | WO-02/095209 A1 | 11/2002 |
| WO | WO-2007/059100 A1 | 5/2007 |
| WO | WO-2007/127962 A2 | 11/2007 |

* cited by examiner

ACTUATING DRIVE FOR BIDIRECTIONAL ACTUATOR

CROSS-REFERENCES TO RELATED APPLICATIONS

This application is a National Stage application which claims the benefit of International Application No. PCT/EP2008/065288 filed Nov. 11, 2008, which claims priority based on German Application No. 10 2007 054 769.4, filed Nov. 16, 2007, both of which are hereby incorporated by reference in their entirety.

TECHNICAL FIELD

The present invention relates to an actuating drive for a bidirectionally adjustable actuator. The invention additionally relates to an exhaust gas recirculation device or an exhaust gas turbocharger equipped with an actuating drive of this type.

BACKGROUND

In order to be able to actuate a valve member, which with an exhaust gas recirculation valve is used for controlling an exhaust gas recirculation rate, an actuating drive is required. Increased requirements are made on an actuating drive of this type. For example soot carried along in the exhaust gas can result in that the valve member sticks to a valve seat complementary thereto, as a result of which relatively high driving forces are required in order to be able to lift the valve member off the seat. In addition, the valve member must be able to realise a comparatively large stroke to achieve high exhaust gas recirculation rates. Furthermore, comparatively short actuating times have to be realised. Similar problems can also occur with other components of exhaust systems. For example with an exhaust gas turbocharger. Such an exhaust gas turbocharger can be equipped with a so-called wastegate valve with which with a turbine of the exhaust gas turbocharger the high-pressure side can be connected with the low-pressure side, for example in order to avoid overloading the turbocharger. Since the wastegate valve is also located on the exhaust gas side, it also requires relatively large actuating forces for opening, for closing and for keeping it closed. In addition there are turbochargers with adjustable guide blade geometry in order to adapt the turbocharger to different operating states of the internal combustion engine equipped with said turbocharger. Here, too, bi-directionally operating actuating drives can be employed.

From DE 10 2005 028 372 an actuating drive is known wherein an electric motor rotationally drives an actuating shaft via a gearing. For realising a large gear ratio and thus a large rotational moment on the actuating shaft two first gears with the same number of teeth are connected in a rotationally fixed manner with a driveshaft of the electric motor and thereby arranged so that their teeth are offset from each other. The two first gears mesh with two second gears which likewise have the same number of teeth and are arranged with tooth offset axially next to each other.

From DE 198 54 614 A1 an actuating device is known, wherein an actuating force amplifier is integrated in a bidirectionally adjustable actuator. The actuator consists of two rods which on the one hand are coupled together via a compression spring and on the other hand via the actuating force amplifier. The actuating force is directed into the first rod while the second rod is drive-coupled to the respective actuating device, e.g. an exhaust gas recirculating valve, to be actuated. With normal actuating resistance, for example with a non-sticking AGR-valve, the actuating forces can be directly transmitted from the first rod to the second rod via the compression spring, that is without force multiplication. With increased actuating resistance, e.g. with a sticking AGR-valve, the movement of the first rod results in the compression spring being compressed and, following an idle movement, in the actuation of the force amplifier, which via a toggle lever arrangement translates the large actuating travel of the first rod into a small actuating travel on the second rod, wherein a corresponding force amplification occurs at the same time. As soon as an initial sticking force has been overcome, the compression spring can again offset the remaining actuating travel.

SUMMARY

The present invention deals with the problem of stating an improved embodiment for an actuating drive of the type mentioned at the outset or for an exhaust gas turbocharger equipped with such an actuating drive or for an exhaust gas recirculation device equipped with such an actuating drive, particularly an exhaust gas recirculating valve, which is characterized by comparatively cost-effective realisability and/or through a defined force-distance characteristic curve.

According to the invention this problem is solved through the subjects of the independent claims. Advantageous embodiments are the subject of the dependent claims.

The invention is based on the general idea of coupling the electric motor to a toggle lever via a gearing in such a manner that the toggle lever, like a connecting rod, on the one end interacts with the actuator to be bidirectionally adjusted, comparable with a piston, and on the other end with a toothing element of the gearing, comparable with a crankshaft. Here, the relative position between the toggle lever and the toothing element in a starting state of the actuating drive is so selected that at the start of an actuating movement the greatest actuating forces are obtained. This relative position is comparable with the relative position of a connecting rod in a dead centre position of a piston driven by said connecting rod. Through the proposed design comparatively large actuating forces can be realised at the start of the actuating movement, wherein towards the end of the actuating movement relatively high actuating speeds can be achieved. Thus, particularly with a valve member on the exhaust side sticking between the valve member and a corresponding valve seat can be overcome, while large actuating strokes can be realised in acceptable actuating times at the same time. Furthermore, such an actuating drive can be constructed relatively cost-effectively. In particular, great closing forces can be achieved by this in order to achieve tight sealing of a wastegate valve.

According to a particularly advantageous embodiment the toggle lever between the toggle lever bearings can comprise a lateral clearance through which a straight line extending through the two toggle lever bearings extends and in which a region of the toothing element assigned to a pivot bearing, about which the toothing element, which is coupled to the toggle lever, is mounted in an articulating manner, dips in the starting state of the actuating drive. As a result of this an embodiment of compact design can be realised wherein the mentioned first straight line can be almost or largely rendered congruent with a straight line which extends through the pivot bearing of the toothing element and through the toggle lever formed between toggle lever and toothing element, as a result of which extremely high initial forces during opening and end forces during closing can be achieved. The angle between the two straight lines in the starting state then is for example smaller than 20° or smaller than 10° or smaller than 5°.

Additional important features and advantages of the invention are obtained from the subclaims, from the drawings and from the corresponding description of the figures by means of the drawings.

It is to be understood that the features mentioned above and still to be explained in the following cannot only be used in the respective combination stated but also in other combinations or by themselves, without departing from the scope of the present invention.

BRIEF DESCRIPTION OF THE DRAWING

Preferred exemplary embodiments of the invention are shown in the drawings and are explained in more details in the following description, wherein identical reference characters relate to identical or similar or functionally identical components.

It shows, in each case schematically.

DETAILED DESCRIPTION

Figure 1:
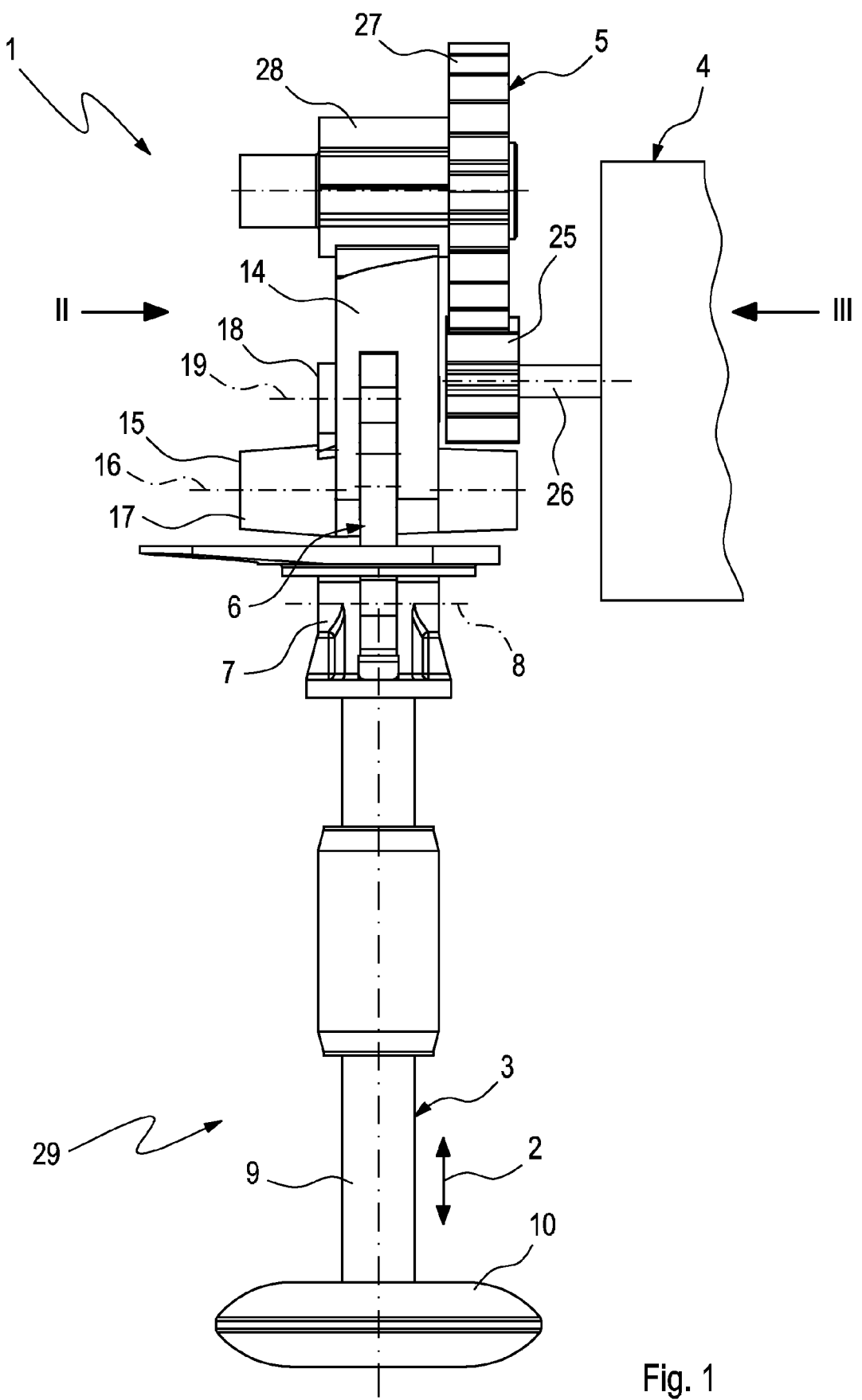
FIG. 1 a lateral view of an actuating drive with a first embodiment.
Figure 2:
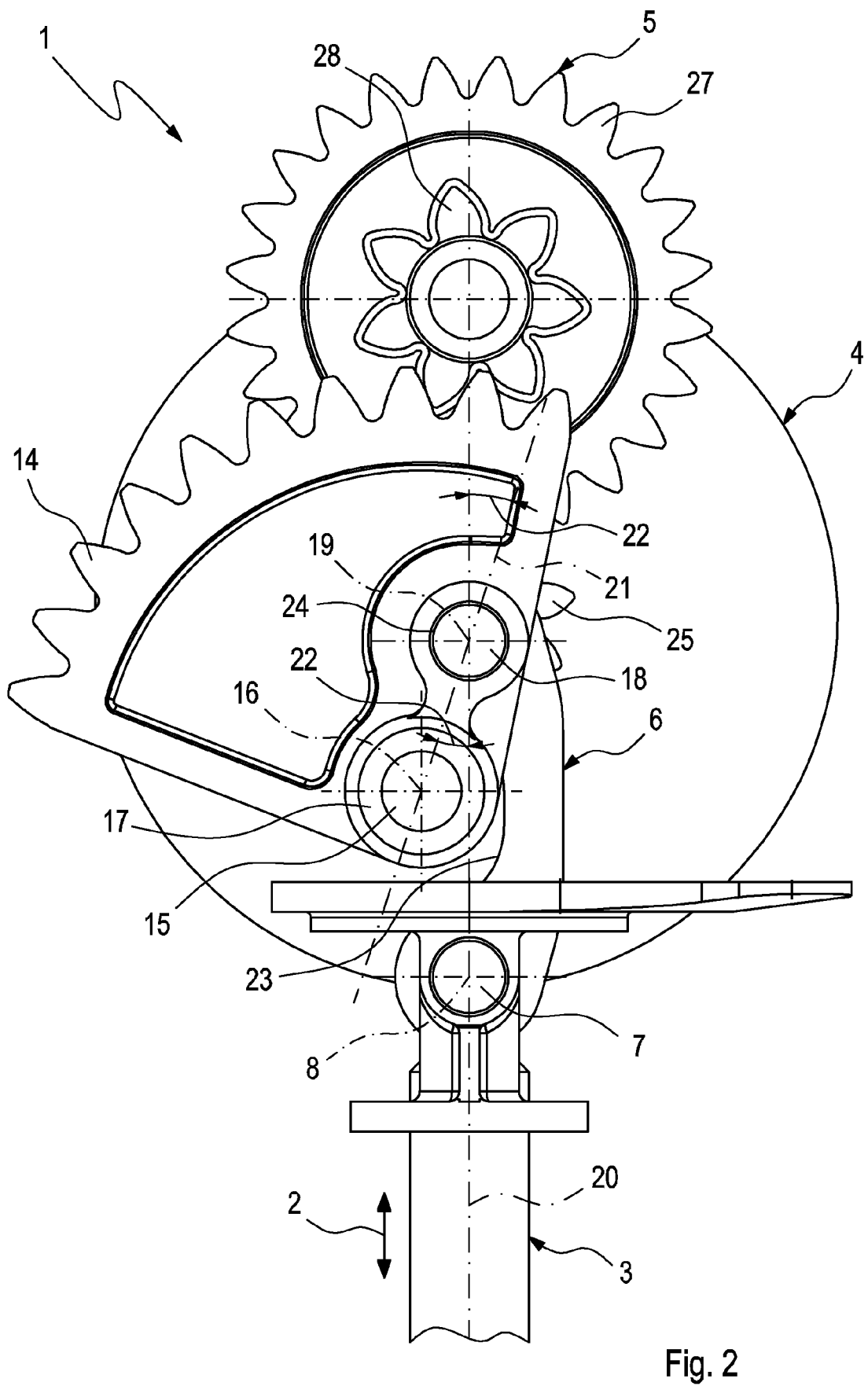
FIG. 2 a lateral view corresponding to a view direction II in FIG. 1.
Figure 3:
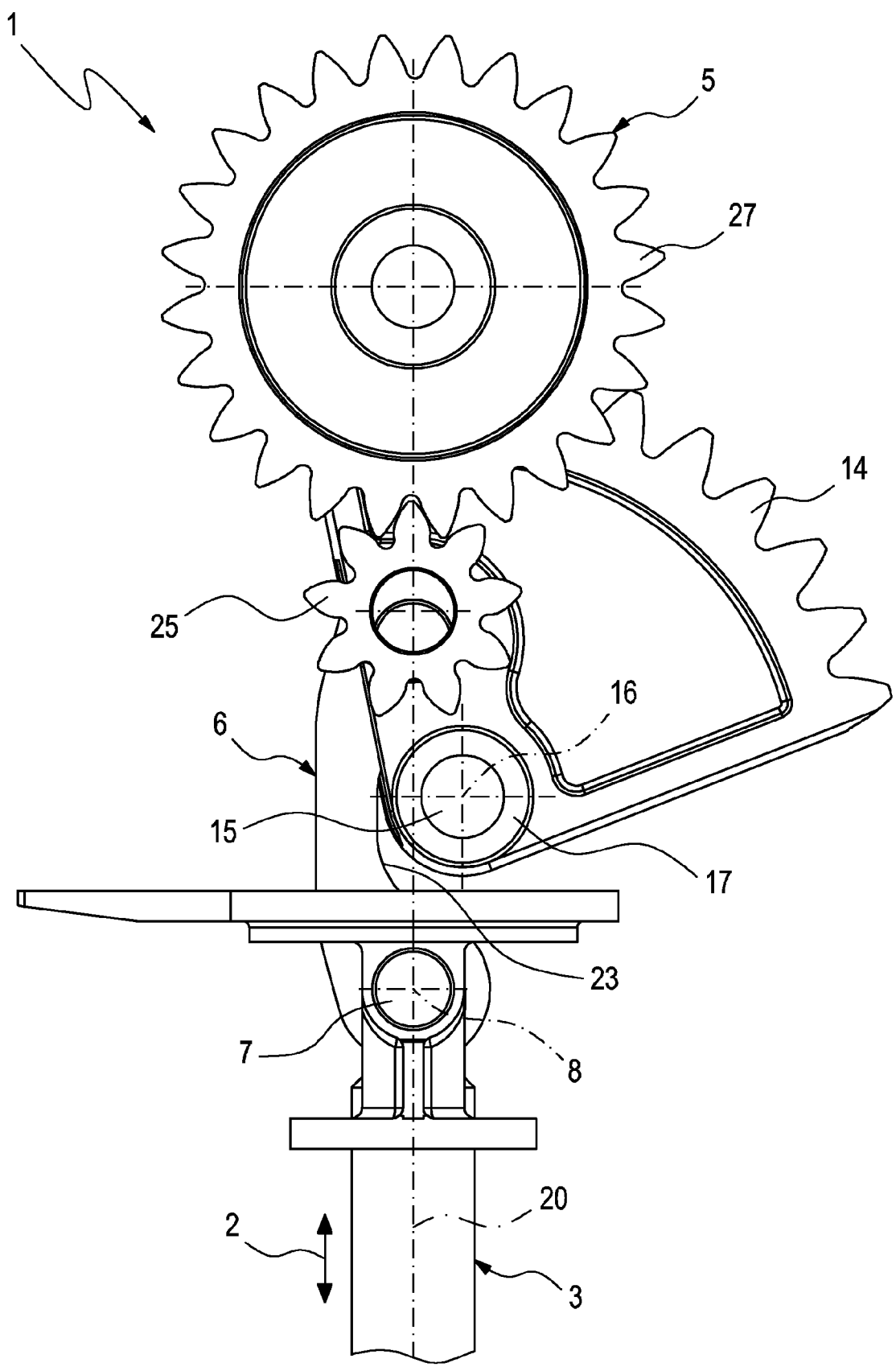
FIG. 3 a lateral view corresponding to a view direction III in FIG. 1.

In accordance with FIGS. 1 to 4 an actuating drive 1, with the help of which an actuator 3 bidirectionally adjustable in accordance with a double arrow 2 can be driven, comprises an electric motor 4, a gearing 5 and a toggle lever 6. The toggle lever 6 can be connected in an articulated manner to the actuator 3 via a first toggle lever bearing 7. Here, a corresponding first toggle lever bearing axis is designated 8. In the shown assembled state the toggle lever 6 via its first toggle lever bearing 7 is connected in an articulated manner to the actuator 3. In the embodiment shown in FIGS. 1 to 3 the actuator 3 is a valve member 9 carrying a valve body 10. With the embodiment shown in FIG. 4 the actuator 3 serves for the driving of a return lever 11 which in turn is connected to a valve body 12 in a rotationally fixed manner, is itself swivel-mounted about an axis of rotation 13 and as a result allows swivelling of the valve body 12 about this axis of rotation 13.

Figure 4:
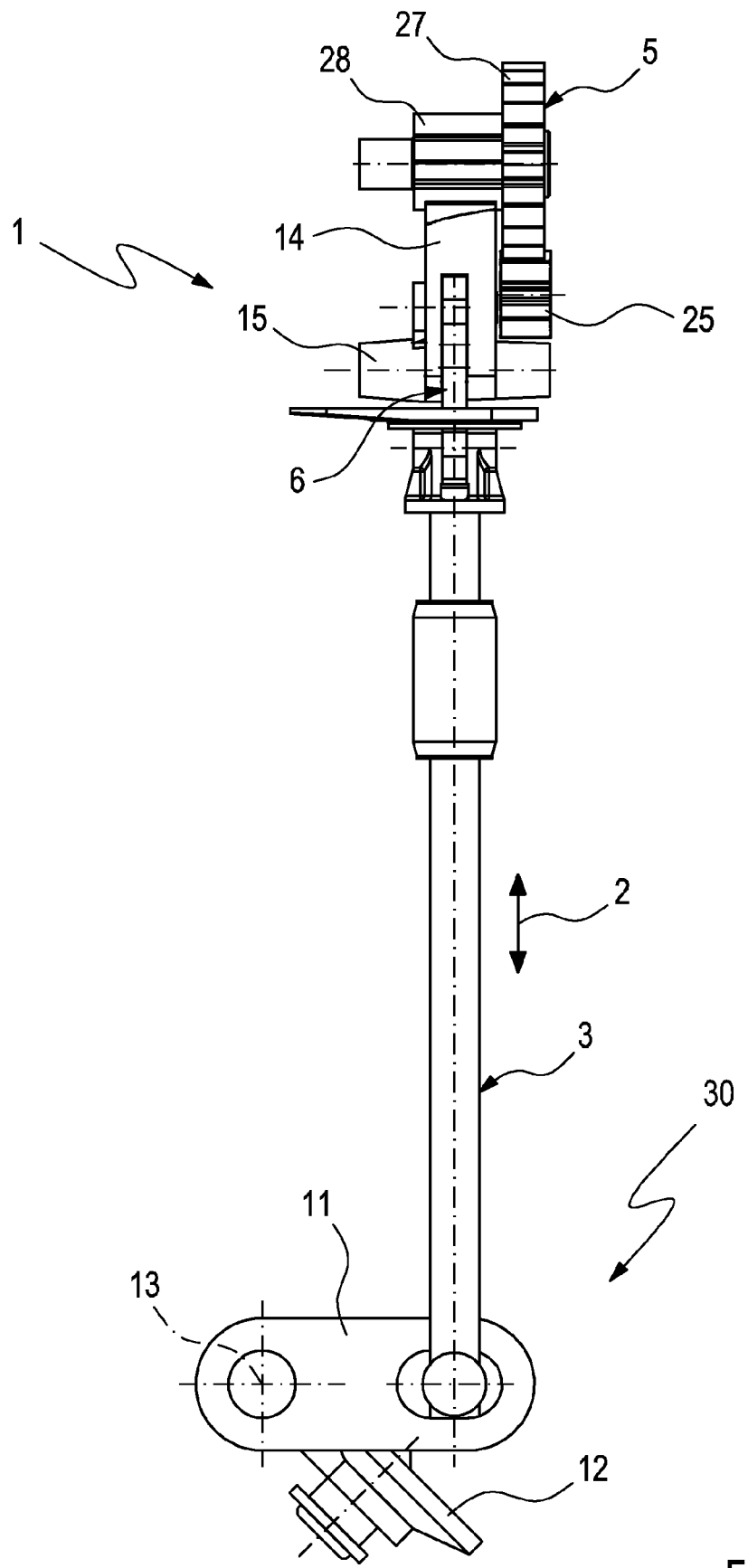
FIG. 4 a view as in FIG. 1, however with a second embodiment.

The gearing 5 connects the electric motor 4 to the toggle lever 6. To this end, the gearing 5 has a toothing element 14 on the output side which is mounted in a pivot bearing 15 about a swivel axis 16 in a manner capable of being swivelled. The swivel bearing 15 in the example is formed by a pivot bearing shaft 17 which in the assembled state of the actuating drive 1 is inserted in locationally fixed shaft mountings, for example in a housing enclosing the actuating drive 1, which is not shown here. The toggle lever 6 is coupled to this toothing element 14 in an articulated manner via a second toggle lever bearing 18, wherein the toggle lever 6 in the second toggle lever bearing 18 can be swivelled about a second toggle lever bearing axis 19 relative to the toothing element 14. Corresponding to FIGS. 2 and 3, which like FIGS. 1 and 4 show a starting state of the actuating drive 1, which is assigned to a starting position of the respective actuator 3, the mentioned toothing element 14 on the output side and the toggle lever 6 are arranged relative to each other and additionally configured such that the following geometrical relationship is obtained:

Between a first straight line 20, which extends through the two toggle lever bearings 7, 18 or through their bearing axes 8, 19, and a second straight line 21, which extends through the swivel bearing 15 and the second toggle lever bearing 18 or through the corresponding swivel axes 16, 19, an angle 22 is spread which in the starting state of the actuating drive 1 is acute. More preferably, this angle 22 is smaller than 20°.

Particularly advantageous here is the shown embodiment wherein the toothing element 14 and the toggle lever 6 are designed and arranged or matched to each other so that in the shown starting state of the actuating drive 1 the first straight line 20 runs quasi parallel to the stroke direction 2 of the actuator 3.

This constellation produces a construction corresponding to a crank drive of a piston engine, wherein a crankshaft bidirectionally drives a piston via a connecting rod. With the actuating drive 1 shown the toggle lever 6 then substantially corresponds to the mentioned connecting rod, the toothing element 14 corresponds to the crankshaft and the actuator 3 then corresponds to the piston. The shown starting state of the actuating drive 1 is then comparable with a dead centre position of the piston. Accordingly, a stroke of the actuator 3 from its starting position commences with a low actuating speed but with a great actuating force. As the stroke increases, the angle 22 between the two straight lines 20, 21 increases, as a result of which the actuating speed of the actuator 3 increases, while the effective actuating force decreases at the same time.

In order to be able to realise the desired parallel axis orientation of the first straight line 20 and the stroke direction 2 with a preferably small angle 22 the toggle lever 6 has a lateral clearance 23 between its toggle lever bearings 7, 18. The first straight line 20 extends through this clearance 23. Furthermore, the positioning of this clearance 23 is so selected that in the starting state of the actuating drive 1 a region of the toothing element 14 on the output side assigned to the pivot bearing 15 can dip into this clearance 23.

In the preferred example shown the toothing element 14 on the output side is a gear segment which extends less than 360° in circumferential direction. Preferably the gear segment 14 extends approximately 90° in circumferential direction. Smaller extension angles are likewise conceivable. The gear segment 14 in the region of the tie-up of the toggle lever 6 can be divided so that the toggle lever 6 in the second toggle lever bearing 18 is articulated in the interior of the gear segment 14. Here, a bearing pin 24 can penetrate webs of the gear segment 14 extending on both sides of the toggle lever 6 and the toggle lever 6.

The gearing 5 shown here comprises a gear 25 on the input side which is connected with a driveshaft 26 of the electric motor 4 in a rotationally fixed manner. This gear 25 on the input side meshes with a first transmission gear 27 which has a significantly greater number of teeth than the gear 25 on the input side. Because of this, a first gear stage can be realised. The first transmission gear 27 is connected with a second transmission gear 28 in a rotationally fixed manner whose number of teeth is smaller than that of the first transmission gear 27. The second transmission gear 28 meshes with the toothing element on the output side, that is the gear segment 14 in this case. The number of teeth of the second transmission gear 28 per circumferential segment is significantly smaller than the number of teeth of the gear segment 14 in this case. As a result, a second gear stage is realised. A further gear is achieved in that the spacing between the swivel axis 16 and the second toggle lever axis 19 is smaller than the spacing between the swivel axis 16 and the engagement between the toothing element 14 on the output side and the second transmission gear 28.

The gearing 5 shown here substantially corresponds to a two-stage spur gearing comprising a toggle lever coupling on the drive side with the bidirectionally or bilinearly adjustable actuator 3. For example, a preferred gear ratio of this two-stage spur gearing can be 12.95. This overall gear ratio can be realised for example in that a first gear stage has a gear ratio of 2.667, while a second gear stage has a gear ratio of 4.857. Through the toggle lever 6, more preferably when activating valves, especially in the region of small opening cross sections, a non-linear opening behaviour with low actuating speed and high opening forces is achieved. This can be utilised for precision meterability with an exhaust gas recirculation valve or accurate regulation of the charging pressure with a wastegate valve in the region of small opening cross sections.

According to FIG. 1, this AGR-valve 29 comprises the valve member 9 with the help of which a cross section through which a flow can flow can be controlled. For example, the valve member 9 with its valve body 10 controls a cross section through which a flow can flow in an exhaust gas recirculation line. As a function of the stroke position of the valve member 9 an exhaust gas recirculation rate through the mentioned AGR-line can be adjusted. The actuating drive 1 proposed here can now be utilised for driving the valve member 9. To this end, an actuating drive of this type can be integrated in the exhaust gas recirculation valve 29 in such a manner that the toggle lever 6 is drive-coupled with the actuator 9.

Corresponding to FIG. 4, an exhaust gas turbocharger 30 shown here only in the region of its wastegate valve 12 can be equipped with the actuating drive 1 shown here for driving its wastegate valve 12. The exhaust gas turbocharger 30 with an internal combustion engine, which is more preferably located in a motor vehicle, serves to increase the pressure level on the fresh gas side. To this end, the exhaust gas turbocharger 30 in usual manner comprises a compressor arranged on the fresh gas side and a turbine arranged on the exhaust gas side. With the wastegate valve 12 or its valve member 12 shown here a bypass can be controlled which connects a high-pressure side of the turbine with a low-pressure side of the turbine. Because of this, the power output of the turbocharger can be controlled. It is remarkable here that the valve member 12 performs a swivel movement even here, namely about the swivel axis 13, while with the actuating drive 1 per se only a bi-linear stroke movement can be realised.

In addition it is fundamentally possible with the help of the actuating drive 1 introduced here to also perform other actuating tasks wherein a degressive actuating force curve or a progressive actuating path curve are particularly important. Also conceivable for example is an application wherein an adjustable guide blade geometry of a turbine of an exhaust gas turbocharger is adjustable or can be controlled with the help of the actuating drive 1.

The invention claimed is:

1. An actuating drive for a bi-directionally adjustable actuator, comprising: at least one of an exhaust gas recirculation device and an exhaust gas turbocharger;
an electric motor;
a toggle lever articulatingly connected with the actuator via a first toggle lever bearing; and
a gear mechanism connecting the electric motor with the toggle lever,
wherein the gear mechanism includes a toothing element on an output side mounted in a pivot bearing, on which the toggle lever is articulatingly mounted via a second toggle lever bearing,
wherein a starting state of the actuating drive is associated with a starting position of the actuator, and wherein an angle between a first straight line extending through the first toggle lever bearing and through the second toggle lever bearing, and a second straight line extending through the pivot bearing and through the second toggle lever bearing, is acute.

2. The actuating drive according to claim 1, wherein when the actuating drive is in the starting state, the first straight line runs substantially parallel to the stroke direction of the actuator.

3. The actuating drive according to claim 1, wherein the toggle lever, between the toggle lever bearings, includes a lateral clearance through which the first straight line extends and in which a region of the toothing element on the output side assigned to the pivot bearing dips in the starting state of the actuating drive.

4. The actuating drive according to claim 1, wherein the toothing element on the output side is a gear segment, which extends in circumferential direction by approximately 90° or less.

5. The actuating drive according to claim 1, wherein the gear mechanism includes a gear on the input side connected with a drive shaft of the electric motor in a rotationally fixed manner.

6. The actuating drive according to claim 5, wherein the gear on the input side meshes with a first transmission gear which has a greater number of teeth than the gear on the input side.

7. The actuating drive according to claim 6, wherein the first transmission gear is connected in a rotationally fixed manner with a second transmission gear having a smaller number of teeth than the first transmission gear.

8. The actuating drive according to claim 7, wherein the second transmission gear meshes with the toothing element on the output side, and wherein the toothing element on the output side has a greater number of teeth per circumferential segment than the second transmission gear.

9. An exhaust gas recirculation valve, comprising:
a valve member, wherein the valve member controls a cross section through which a gas flows, with which an exhaust gas recirculating rate of the exhaust gas recirculation device is adjusted as a function of its stroke position; and
an actuating drive for driving the valve member, wherein the actuating drive includes an electric motor, an articulating toggle lever connected to the actuator via a first toggle lever bearing; and a gear mechanism connecting the electric motor with the toggle lever, wherein the gear mechanism includes a toothing element on an output side mounted in a pivot bearing, on which the articulating toggle lever is mounted via a second toggle lever bearing, and wherein when the actuating drive is in a starting state, the actuating drive in a starting position associated with the actuator, and wherein an acute angle exists between a first straight line extending through the first toggle lever bearing and through the second toggle lever bearing, and a second straight line extending through the pivot bearing and through the second toggle lever bearing.

10. The exhaust gas recirculation valve according to claim 9, wherein when the actuating drive is in the starting state, the first straight line runs substantially parallel to the stroke direction of the actuator.

11. The exhaust gas recirculation valve according to claim 9, wherein the toggle lever, between the toggle lever bearings, includes a lateral clearance through which the first straight line extends and in which a region of the toothing element on the output side assigned to the pivot bearing dips in the starting state of the actuating drive.

12. The exhaust gas recirculation valve according to claim 9, wherein the toothing element on the output side is a gear segment which extends in circumferential direction by approximately 90° or less.

13. The exhaust gas recirculation valve according to claim 9, wherein the gear mechanism includes a gear on the input side connected with a drive shaft of the electric motor in a rotationally fixed manner.

14. The exhaust gas recirculation valve according to claim 13, wherein the gear on the input side meshes with a first transmission gear, which has a greater number of teeth than the gear on the input side.

15. The actuating drive according to claim 14, wherein the first transmission gear is connected in a rotationally fixed manner with a second transmission gear having a smaller number of teeth than the first transmission gear.

16. The exhaust gas recirculation valve according to claim 15, wherein the second transmission gear meshes with the toothing element on the output side, and wherein the toothing element on the output side has a greater number of teeth per circumferential segment than the second transmission gear.

17. An exhaust gas turbocharger, comprising:
   a wastegate valve having a valve member, wherein the valve member controls a by-pass connecting a high-pressure side with a low-pressure side of a turbine of the exhaust gas turbocharger,
   an a valve member actuating drive, wherein the valve member actuating drive includes an electric motor, an articulating toggle lever connected to the actuator via a first toggle lever bearing; and a gear mechanism connecting the electric motor with the toggle lever, wherein the gear mechanism includes a toothing element on an output side mounted in a pivot bearing, on which the articulating toggle lever is mounted via a second toggle lever bearing, and wherein when the actuating drive is in a starting state, the actuating drive in a starting position associated with the actuator, and wherein an acute angle exists between a first straight line extending through the first toggle lever bearing and through the second toggle lever bearing, and a second straight line extending through the pivot bearing and through the second toggle lever bearing.

18. The exhaust gas turbocharger according to claim 17, wherein when the actuating drive is in the starting state, the first straight line runs substantially parallel to the stroke direction of the actuator.

19. The exhaust gas turbocharger according to claim 17, wherein the toggle lever, between the toggle lever bearings, includes a lateral clearance through which the first straight line extends and in which a region of the toothing element on the output side assigned to the pivot bearing dips in the starting state of the actuating drive.

20. The exhaust gas turbocharger for an internal combustion engine, comprising:
   a turbine having a guide blade geometry that is adjustable with an actuator; and
   an actuator actuating drive, wherein the actuating drive includes an electric motor, an articulating toggle lever connected to the actuator via a first toggle lever bearing; and a gear mechanism connecting the electric motor with the toggle lever, wherein the gear mechanism includes a toothing element on an output side mounted in a pivot bearing, on which the articulating toggle lever is mounted via a second toggle lever bearing, and wherein when the actuating drive is in a starting state, the actuating drive in a starting position associated with the actuator, and wherein an acute angle exists between a first straight line extending through the first toggle lever bearing and through the second toggle lever bearing, and a second straight line extending through the pivot bearing and through the second toggle lever bearing.

* * * * *